US005106523A

United States Patent [19]

Peterson

[11] Patent Number: 5,106,523

[45] Date of Patent: Apr. 21, 1992

[54] THICKENED ACIDIC LIQUID COMPOSITION WITH AMINE FWA USEFUL AS A BLEACHING AGENT VEHICLE

[75] Inventor: David Peterson, Pleasanton, Calif.

[73] Assignee: The Clorox Company, Oakland, Calif.

[21] Appl. No.: 367,375

[22] Filed: Jun. 16, 1989

[51] Int. Cl.$^5$ ........................ C11D 3/395; C11D 7/54; C09K 3/00

[52] U.S. Cl. ........................................ 252/95; 252/100; 252/102; 252/186.42; 252/186.43; 252/142; 252/DIG. 14; 252/543; 252/542

[58] Field of Search ............ 252/95, 100, 102, 186.42, 252/186.43, 142, DIG. 14, 543, 542

[56] References Cited

U.S. PATENT DOCUMENTS

| | | | |
|---|---|---|---|
| 2,980,625 | 4/1961 | Crounse | 252/543 |
| 3,968,046 | 7/1976 | Smeets | 252/95 |
| 3,968,047 | 7/1976 | Smeets | 252/95 |
| 3,996,152 | 12/1976 | Edwards et al. | 252/186.25 |
| 4,130,501 | 12/1978 | Lutz et al. | 252/95 |
| 4,238,192 | 12/1980 | Kandathil | 8/111 |
| 4,515,929 | 5/1985 | Tang | 526/228 |
| 4,525,291 | 6/1985 | Smith et al. | 252/95 |
| 4,529,773 | 7/1985 | Witiak et al. | 524/558 |
| 4,552,682 | 11/1985 | Black et al. | 252/186.26 |
| 4,552,685 | 11/1985 | Kernstock et al. | 252/355 |
| 4,764,302 | 8/1988 | Baker et al. | 252/301.23 |
| 4,772,290 | 9/1988 | Mitchell et al. | 8/107 |
| 4,781,854 | 11/1988 | Overton et al. | 252/100 |
| 4,891,147 | 1/1990 | Gray et al. | 252/104 |
| 4,900,468 | 2/1990 | Mitchell et al. | 252/95 |
| 4,900,469 | 2/1990 | Farr et al. | 252/96 |

FOREIGN PATENT DOCUMENTS

| | | |
|---|---|---|
| 1249822 | 9/1967 | Fed. Rep. of Germany . |
| 1113696 | 5/1986 | Japan . |

*Primary Examiner*—Paul Lieberman
*Assistant Examiner*—Mary C. DiNunzio
*Attorney, Agent, or Firm*—Majestic, Parsons, Siebert & Hsue

[57] ABSTRACT

A liquid laundry product which thickens in the acidic pH range preferably by combination of an amide, an alkyl sufate and/or alkyl aryl sulfonate, and a normally insoluble, but solubilized, fluorescent whitening agent containing amine groups. The composition may also contain a peroxide bleaching agent.

6 Claims, No Drawings

THICKENED ACIDIC LIQUID COMPOSITION WITH AMINE FWA USEFUL AS A BLEACHING AGENT VEHICLE

FIELD OF THE INVENTION

The present invention generally relates to liquid bleaching compositions, and more particularly to a thickened acidic liquid composition having dissolved amine brightener that may include a bleach effective amount of bleaching agent such as peroxide.

BACKGROUND OF THE INVENTION

Some consumers are believed to show a preference for thickened cleaning or brightening compositions, and thickened cleaners are useful, for example, as oven cleaners, paint strippers and toilet bowl cleaners as they can be more readily positioned upon the area being cleaned. Additives for thickeners have included natural gums such as guar and locust bean extract, starches and cellulose and their derivatives.

Polymeric thickeners for acidic surfactant compositions are described by U.S. Pat. No. 4,552,685, issued Nov. 12, 1985, inventors Kernstock et al. and by U.S. Pat. No. 4,529,773, issued July 16, 1985, inventors Witiak et al. However, these acidic-thickened solutions require high levels of surfactant in order to solubilize the copolymers and they have higher viscosities at pH 7 than when the pH is lowered into the acidic region.

U.S. Pat. No. 4,515,929, issued May 7, 1985, inventor Tang and No. 4,552,682, issued Nov. 12, 1985, inventors Black and Tang, teach solid organic peroxide that is dispersed with a surfactant and thus is in emulsion or suspension in a thickened aqueous phase. Thickeners for the aqueous phase can be such as polyvinylalcohol, polyacrylic acid or polyvinylpyrrolidone. The organic peroxide is thus a discontinuous phase. Earlier, U.S. Pat. No. 4,130,501, issued Dec. 19, 1978, inventors Lutz and Cohen, disclosed that liquid bleaches based upon hydrogen peroxide were not stably thickened with polyvinylpyrrolidone.

SUMMARY OF THE INVENTION

In one aspect of the present invention, a thickened acidic liquid composition is provided that includes a solubilized amine-containing fluorescent whitening agent as part of the thickener and preferably also includes a bleaching agent. The composition is useful as a laundering aid and comprises an aqueous solution having a pH below about 7 and a thickener in an amount effective to thicken the aqueous solution to a desired viscosity. This thickener is dissolved in the aqueous solution, and the composition can be formulated to be substantially clear. The thickener preferably includes three components: an amide or a polymeric amide, an amine-containing fluorescent whitener, and an alkyl sulfate and/or alkylaryl sulfonate surfactant.

Due to the presence of fluorescent whitening agent (FWA) in the thickened acidic liquid composition, use can be made as a laundering aid since once the composition is diluted and neutralized in the washing solution, then the FWA is substantive and performs a brightening function. Particularly preferred embodiments also include a bleaching agent, such as a source of peroxide, in a bleach effective amount.

DETAILED DESCRIPTION OF THE PREFERRED EMBODIMENTS

Compositions of the invention are preferably thickened with three components, or component types. The three components are (a) an amide or a polymeric amide, (b) an amine containing fluorescent whitener, and (c) an alkyl sulfate and/or alkyl aryl sulfonate surfactant. It is believed that at the acidic pH of the inventive compositions (with a pH below 7) the amide (whether polymeric or not) complexes with the sulfate or sulfonate surfactant and with the amine-containing fluorescent whitener. The fluorescent whitener is normally insoluble at acidic pH, but is solubilized in compositions of the invention to give relatively clear, thickened solutions. As will be more fully described, the amide component can be eliminated, but to do so tends to create storage instability problems. Each of the three component types will now be more specifically described.

Amide or Polymeric Amide

The amide component should be from about 0.01 wt. % to about 5 wt. %, more preferably from about 0.05 wt. % to about 1 wt. %, of the total composition. Among the suitable polymeric amides, for example, are those known as polyvinyl pyrrolidone, typically with a molecular weight range from about 10,000 to about 1,000,000, and having the structures where n is about $n=100$ to about $n=10,000$.

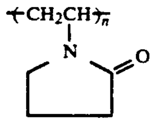

Suitable polymeric amides include the pyrrolidone homopolymer, polyvinylpyrrolidone, and copolymers of vinylpyrrolidone with vinyl acetate, styrene, vinylchloride, vinyl ethers, acrylic and methacrylic acids and esters, maleates and fumarates. Also included are alkylpyrrolidone surfactants.

Other suitable amides are the carboxylic amide nonionic surfactants (condensation products of fatty acids and hydroxyalkyl amides) and fatty acid diethanolamides. Particularly preferred of these fatty acid diethanolamides are the superamides. Suitable amides are described in *Kirk-Othmer, Encyclopedia of Chemical Technology*, 3rd Edition, Vol 22 pg. 373-376 (1983), incorporated by reference.

Table IA illustrates the criticality of the amide component in thickening compositions of the invention where the polymeric amide was polyvinylpyrrolidone ("PVP").

TABLE IA

| Components | Wt. % | pH | Viscosity (cps) | Turbidity (NTU) |
|---|---|---|---|---|
| Inventive Composition (a) | | 3.8 | 325 | 48 |
| Polymeric amide[1] | 0.10 | | | |
| Amine FWA[2] | 0.32 | | | |
| Sulfate/sulfonate surfactant[3] | 1.50 | | | |
| $H_2O_2$ | 3.50 | | | |
| Optional chelating agent[4] | 0.12 | | | |
| Remainder water | | | | |
| Comparative Composition (a) | | 4.0 | separates | N/A |

TABLE IA-continued

| Components | Wt. % | pH | Viscosity (cps) | Turbidity (NTU) |
|---|---|---|---|---|
| Polymeric amide | 0.00 | | | |
| Amine FWA[2] | 0.32 | | | |
| Sulfate/sulfonate surfactant[3] | 1.50 | | | |
| $H_2O_2$ | 3.50 | | | |
| Optional chelating agent[4] | 0.12 | | | |
| Remainder water | | | | |

[1]PVP-K30 (GAF Corp.)
[2]Phorwite RKH (Mobay Corp.)
[3]Stepanol AMV (Stepan Corp.)
[4]Dequest 2000 (Monsanto)

As can be seen from the data of Table IA, omission of the polymeric amide in comparative composition (a) resulted in a composition that separates after two weeks at 40° C. By contrast, inventive composition (a) resulted in a stably thickened, substantially clear composition having a viscosity of 325 cps after two weeks at 40° C. The viscosity measurements were taken using conventional techniques with a Brookfield Viscometer, model LVT, using spindle no. 3 at 20 rpm and 24° C.

Compositions of the invention should have a viscosity between about −50–1,000 cps, more preferably about 100 to 600 cps. The inventive composition (a) thus had good thickening with relatively little surfactant present (1.50 wt. %), showed no loss of $H_2O_2$, and illustrates a substantially clear, thickened acidic laundering aid composition of the invention.

Table IB shows that a non-polymeric amide, such as an alkanolamide, can be substituted for the PVP.

TABLE IB

| Components | Wt. % | pH | Viscosity (cps) | Turbidity (NTU) |
|---|---|---|---|---|
| Inventive Composition (b) | | 4.2 | 850 | 48 |
| Amide[1] | 0.50 | | | |
| Amine FWA[2] | 0.32 | | | |
| Sulfate/sulfonate surfactant[3] | 1.25 | | | |
| $H_2O_2$ | 3.50 | | | |
| Optional chelating agent[4] | 0.12 | | | |
| Remainder water | | | | |

[1]A diethanol coco superamide. "Emid 6515" (Emery)
[2]Phorwite RKH (Mobay)
[3]Stepanol AMV (Stepan)
[4]Dequest 2000 (Monsanto)

Compositions prepared without the amide component have poorer storage stability in that they tend to develop gel particles upon storage, for example at elevated temperatures. These gel particles can exist as solid-like particles suspended in the liquid medium.

Such compositions also tend to need higher amounts of surfactant, especially alkylaryl sulfonate surfactants. However, under certain circumstances (such as where compositions will be stored at cool temperatures), then positions considered to be within the scope of this invention can be prepared with no amide. Table IIIB, discussed hereinafter in connection with surfactant, illustrates two of these compositions prepared with no amide component. These two compositions did tend to develop gel particles on high temperature storage at 49° C., and are thus less preferred embodiments of the invention.

Fluorescent Whitener

Suitable fluorescent whiteners should be present in compositions of the invention in amounts from about 0.05 to about 1 wt. %, preferably about 0.1 to about 0.6 wt. %, of the total composition. Amine-containing fluorescent whiteners (also referred to as optical brighteners, or FWA's) are common commercial products. Such products are fluorescent materials, very often substituted stilbenes and biphenyls, and have the ability to fluoresce by absorbing ultraviolet wavelengths of light and then emitting visible light, generally in the blue wavelength ranges. The whiteners settle out or deposit onto the fabrics during the bleaching or washing process to thereby impart the desired whiteness.

Suitable brighteners in compositions of the invention are those that normally would be insoluble at acidic pH, but that are soluble in the formulation below pH 7, more preferably pH 6, and possess amine groups.

Table IIA illustrates the importance of including the amine-containing brightener.

TABLE IIA

| Components | Wt. % | pH | Viscosity (cps) | Turbidity (NTU) |
|---|---|---|---|---|
| Inventive Composition (c) | | 4.4 | 250 | 58 |
| Amide[1] | 0.10 | | | |
| Amine FWA[2] | 0.32 | | | |
| Sulfate/sulfonate surfactant[3] | 1.25 | | | |
| $H_2O_2$ | 3.50 | | | |
| Optional chelating agent[4] | 0.12 | | | |
| Remainder water | | | | |
| Comparative Composition (b) | | 4.0 | separates | N/A |
| Amide[1] | 1.00 | | | |
| Amine FWA | 0.00 | | | |
| Sulfate/sulfonate surfactant[3] | 1.50 | | | |
| $H_2O_2$ | 3.50 | | | |
| Optional chelating agent[4] | 0.12 | | | |
| Remainder water | | | | |

[1]PVP-K30 (GAF)
[2]Phorwite RKH (Mobay)
[3]Stepanol AMV (Stepan)
[4]Dequest 2000 (Monsanto)

As can be seen by the data for inventive composition (c), the combination of amide, amine FWA and sulfate or sulfonate surfactant gave a relatively clear, viscous solution even after two weeks at 40° C. In addition, there was no loss of hydrogen peroxide and the composition was stable to freeze-thaw. By contrast, comparative composition (b) separated after two weeks at 40° C.

Sulfate and/or Sulfonate Surfactant

The sulfate and/or sulfonate surfactant component should be present in amounts from about 0.1 wt. % to about 10 wt. %, more preferably from about 0.5 wt. % to about 5 wt. % of the total composition.

Exemplary sulfate surfactants are ammonium lauryl sulfate (available from Stepan as Stepanol AMV), sodium lauryl sulfate or linear alkyl benzene sulfonic acid ("HLAS", typically linear dodecyl benzene sulfonic acid) or its salts. Conveniently available linear alkyl aryl sulfonic acids have an average side chain of about 11.5 carbon atoms, and are sold by a number of suppliers (e.g. Witco Chemical Corporation as Witco 1298 Soft Acid, and Stepan Chemical Company as Bio Soft S-100).

Table IIIA illustrates the necessity for use of an alkyl sulfate surfactant and/or of alkyl aryl sulfonate surfactant and Table IIIB illustrates uses of the alkyl aryl sulfonate surfactant as a full or partial replacement for the alkyl sulfate surfactant.

TABLE IIIA

| Components | Wt. % | pH | Viscosity (cps) | Turbidity (NTU) |
|---|---|---|---|---|
| Comparative Composition (c) | | 4.0 | separates | N/A |
| Amide[1] | 1.00 | | | |
| Amine FWA[2] | 0.32 | | | |
| Sulfate/sulfonate surfactant | 0.00 | | | |
| $H_2O_2$ | 3.50 | | | |
| Optional chelating agent[4] | 0.12 | | | |
| Remainder water | | | | |
| Inventive Composition (d) | | 3.5 | 190 | 64 |
| Amide[1] | 0.075 | | | |
| Amine FWA[2] | 0.32 | | | |
| Sulfate/sulfonate surfactant[3] | 1.00 | | | |
| $H_2O_2$ | 3.50 | | | |
| Optional chelating agent[4] | 0.12 | | | |
| Remainder water | | | | |

[1]PVP-K30 (GAF)
[2]Phorwite RKH (Mobay)
[3]Stepanol AMV (Stepan)
[4]Dequest 2000 (Monsanto)

TABLE IIIB

| Components | Wt. % | pH | Viscosity (cps) | Turbidity (NTU) |
|---|---|---|---|---|
| Inventive Composition (e) | | | | |
| Amide[1] | 0.20 | 3.2 | 350 | 392 |
| Amine FWA[2] | 0.32 | | | |
| Sulfate/sulfonate surfactant[3] | 3.00 | | | |
| $H_2O_2$ | 3.50 | | | |
| Optional chelating agent[4] | 0.12 | | | |
| Remainder water | | | | |
| Composition (f) | | 3.3 | 80 | 245 |
| Amide | 0.00 | | | |
| Amine FWA[2] | 0.32 | | | |
| Sulfate/sulfonate surfactant[3] | 4.00 | | | |
| $H_2O_2$ | 3.50 | | | |
| Optional chelating agent[4] | 0.12 | | | |
| Remainder water | | | | |
| Inventive Composition (g) | | 4.0 | 735 | 102 |
| Polymeric amide | 0.00 | | | |
| Amine FWA[2] | 0.32 | | | |
| Sulfate surfactant[5] | 1.00 | | | |
| Sulfonate surfactant[3] | 1.00 | | | |
| $H_2O_2$ | 3.50 | | | |
| Optional chelating agent[4] | 0.12 | | | |
| Remainder water | | | | |

[1]PVP-KGO (GAF)
[2]Phorwite RKH (Mobey)
[3]HLAS (Pfaltz & Bauer)
[4]Dequest 2000 (Monsanto)
[5]Stepanol AMV (Stepan)

pH Control and Effects

Compositions of the invention can be prepared by mixing the surfactant, polymeric amide and brightener together at near neutral pH. Then the bleach, chelating agent and any other optional ingredients are mixed in. Finally, the pH of the composition is adjusted to the desired level.

Compositions of the invention show a dramatic increase in viscosity as the pH is decreased below about 7, as is shown in Table IV.

TABLE IV

| Composition | pH | Viscosity (cps) |
|---|---|---|
| Inventive composition (a) | 7.1 | 85 |
| | 6.3 | 335 |
| | 5.0 | 275 |
| | 3.7 | 290 |
| | 2.6 | 300 |

When the pH of inventive composition (a) is lowered from 7.1 to 6.3, then a sharp increase in viscosity is seen. This data illustrates the pH dependence of the combined interactions of the necessary components.

Optional Components

Non-Ionic Surfactants.

Nonionic surfactants are optional components of the invention and are preferably selected from the group consisting of $C_{6-18}$ alcohols with 1.15 moles of ethylene oxide per mole of alcohol, $C_{6-18}$ alcohols with 1-10 moles of propylene oxide per mole of alcohol, $C_{6-18}$ alcohols with 1-15 moles of ethylene oxide and 1-10 moles of propylene oxide per mole of alcohol, $C_{6-18}$ alkylphenols with 1-15 moles of ethylene oxide or propylene oxide or both, and mixtures of any of the foregoing. Certain suitable surfactants are available from Shell Chemical Company under the trademark Neodol. Suitable surfactants include Neodol 25-9 ($C_{12-15}$ alcohol with an average 9 moles of ethylene oxide per mole of alcohol). Another suitable surfactant may be Alfonic 1218-70, which is based on a $C_{12-18}$ alcohol and which is ethoxylated with about 0.7 moles of ethylene oxide per mole of alcohol, from Vista Chemical, Inc. These and other nonionic surfactants used in the invention can be either linear or branched, or primary or secondary alcohols. If surfactants used are partially unsaturated, they can vary from $C_{10-22}$ alkyoxylated alcohols, with a minimum iodine value of at least 40, such as exemplified by Drozd et al., U.S. Pat. No. 4,668,423, incorporated herein by reference. An example of an ethoxylated, propoxylated alcohol is Surfonic JL-80X ($C_{9-11}$) alcohol with about 9 moles of ethylene oxide and 1.5 moles of propylene oxide per mole of alcohol), available from Texaco Chemical Company.

Other suitable nonionic surfactants may include polyoxyethylene carboxylic acid esters, fatty acid glycerol esters, fatty acid and ethoxylated fatty acid alkanolamides, certain block copolymers of propylene oxide and ethylene oxide and block polymers of propylene oxide and ethylene oxide with a propoxylated ethylene diamine (or some other suitable initiator). Still further, such semi-polar nonionic surfactants as amine oxides, phosphine oxides, sulfoxide and their ethoxylated derivatives, may be suitable for use herein.

Illustrative thickened compositions of the invention prepared with inclusion of a nonionic surfactant are seen from the data of Table V.

TABLE V

| Components | Wt. % | pH | Viscosity (cps) | Turbidity (NTU) |
|---|---|---|---|---|
| Inventive Composition (e) | | 4.4 | 165 | 89 |

TABLE V-continued

| Components | Wt. % | pH | Viscosity (cps) | Turbidity (NTU) |
|---|---|---|---|---|
| Amide[1] | 0.05 | | | |
| Amine FWA[2] | 0.32 | | | |
| Sulfate/sulfonate surfactant[3] | 0.89 | | | |
| $H_2O_2$ | 3.50 | | | |
| Optional chelating agent[4] | 0.12 | | | |
| Optional nonionic surfactant[5] | 2.00 | | | |
| Remainder water | | | | |
| Inventive Composition (f) | | 3.4 | 260 | 69 |
| Amide[1] | 0.10 | | | |
| Amine FWA[2] | 0.32 | | | |
| Sulfate/sulfonate surfactant[3] | 0.67 | | | |
| $H_2O_2$ | 3.50 | | | |
| Optional chelating agent[4] | 0.12 | | | |
| Optional nonionic surfactant[5] | 2.00 | | | |
| Remainder water | | | | |

[1]PVP-K30 (GAF)
[2]Phorwite RKH (Mobay)
[3]Stepanol AMV (Stepan)
[4]Dequest 2000 (Monsanto)
[5]Neodol 25-7

The two inventive compositions illustrated by the data of Table V were stable after storage of two weeks at 49° C.

Bleach

A liquid bleach source may be selected from various types of bleaches such as halogen, peroxygen and peracid bleaches. The thickening system is compatible with any oxidant bleach which can be suspended in it. In general, the bleach must also be compatible with the acid pH necessary to thicken the composition. The bleach must be able to supply to oxidizing species at the acid pH, and should be resistant to degradation thereby. Preferred as bleaches are the peroxygen or peracid bleaches. Peroxygen bleaches are preferred in terms of manufacturing cost, and preferably are added as an aqueous solution. The aqueous bleach is present in an amount sufficient to provide effective bleaching, e.g., from about 0.05 to 50% by weight active, more preferably from about 0.1 to 35% by weight active and most preferably from about 0.5 to 15% by weight active depending on the bleaching species chosen. Peracid bleaches (including monoperacids and diperacids) may be advantageous in terms of bleaching performance. Peracid bleaches, however, must be added in an insoluble form, due to their greater reactivity. Suitable peracid bleaching species include $C_{8-12}$ alkyl peracids especially perazelaic and diperazelaic acids, diperoxydodecanedioic acid (DPDDA), and alkyl monoperosuccinic acid. Peracid bleaching species, and a method for their production, are described in U.S. Pat. No. 4,337,213, issued June 29, 1982, inventors Marynowski et al. DPDDA is particularly preferred for use in the composition of the present invention as it is relatively storage stable and produces desirable bleaching results. Other potential suitable peracids are identified in U.S. Pat. No. 4,391,725, issued July 5, 1983, inventor Bossu. If added, the total peracid may range from about 0.1 to 50, preferably about 0.1-15, mott preferably about 2-10 weight percent, and total oxidant present should generally not exceed about 50 weight percent. Halogen bleaches are ordinarily ineffective at acid pH and are therefore not preferred.

The particularly preferred bleach source is hydrogen peroxide, normally supplied as liquid hydrogen peroxide, although other hydrogen peroxide sources may also function satisfactorily. For example, perborate and percarbonate also supply $H_2O_2$ in solution. The peroxide is present in the range of about 0.05-50% by weight active, more preferred is 0.1-35% by weight active, and most preferred is 0.5-15% by weight active. Numerous sources manufacture and/or market hydrogen peroxide on a commercial basis, and one example of a commercial source is the FMC Company of Philadelphia, Pennsylvania. Ordinarily the peroxide is purchased as a concentrated aqueous solution, for example a 70% solution, and is diluted with the deionized water to the desired strength.

Bleach Activator

A useful addition to the thickened peroxygen bleaching compositions disclosed herein are insoluble bleach activators, especially peracid activators, also known as peracid precursors. The activators employed in the bleaching compositions of the invention may be characterized as being insoluble at pHs of about 7 or less used for storage (neutral or acidic pH's) and also being about 10-1000 times, preferably 50-1000 times, most preferably 100-1000 times as soluble at pHs of greater than about 7 (alkaline pHs) used in bleaching. Activators which can exhibit this pH-dependent solubility are activators containing weakly acidic groups such as free carboxylic acid groups, sulfonamide groups, thiocarboxylic acid groups, aromatic hydroxyls, aromatic thiols, aromatic anhydrides, cyclic amide groups, and phosphite groups as solubilizers. At acidic pHs such groups are not ionized and contribute to insolubility. At basic pHs these groups become increasingly ionized and solubilize the activator. These groups appear to be uniquely suited as solubilizers in this setting. Sulfonate or phosphonate groups are not acceptable because they are extensively ionized, and lead to extensive activator solubilization at the acidic pH's where nonionization and insolubilization are sought. Quaternary ammonium groups are inappropriate as well as they will tend to form ion pairs with anions present in the wash mixture. Thus, the activators employed herein can be classified as containing ionizable solubilizing groups that are substantially unionized at conditions of storage and substantially ionized at conditions of use, and contain no sulfonate, phosphate or quaternary ammonium groups. Representative suitable solubilizing groups are aromatic and aliphatic carboxylic acids and thioacids and their alkali metal and alkaline earth metal salts, as well as aromatic alcohols and aromatic thiols, aromatic anhydrides, maleimides and sulfonamides.

The peracid precursors used herein may be represented structurally as:

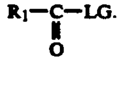

That is, they contain a carbonyl group attached to a leaving group "LG" which is displaced when the peracid forms and "$R_1$" group which is an organic residue of 1 to 20 carbon atoms. The weakly acidic solubilizer group or groups "SG" can be attached to either the $R_1$ or the LG portion of the molecule.

The SG group may be selected from groups such as an aromatic -COOM, a -CSOH, an aromatic -OH-, an aromatic -SH, a compound with the structure

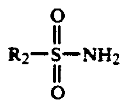

or compounds having the following moieties (where the ◯ symbol means an aromatic ring is adjacent, or bonded to, the indicated moiety):

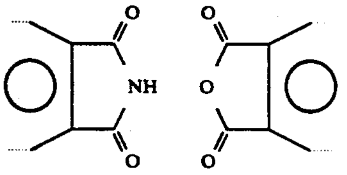

In these typical SG groups structures, $R_2$ is an organic linking or bridging group typically having less than about 8 carbon atoms. Representative $R_2$ groups are alkylenes of from 1 to about 4 carbon atoms, and 6 to 8 carbon arylenes and alkarylenes, such as methylene, ethylene, propylene, butylene, phenylene, phenylene-methylene, and the like. Also in these structures, M is hydrogen, an alkali metal ion or an alkaline earth metal ion such as sodium, potassium, calcium or magnesium. When aromatic groups are present in the SG groups, they can be substituted with alkyls of from 1 to 6 carbon atoms, halogens, e.g., chloros or bromos, acyls of 1 to 4 carbon atoms, other aryls of up to 6 carbon atoms, either pendent or fused, or alkoxies of from about 1 to 6 carbon atoms, if desired. Multiple substitution is possible, as well, if desired.

$R_1$, the $C_{1-20}$ organic residue, an be a hydrocarbon such as a branched or straight chain alkyl or alkenyl, an aryl, an alkaryl or the like, or a substituted hydrocarbon such as an ether or an amine. Typically, $R_1$ may be selected from alkyls and alkenyls of from 1 to about 20 carbon atoms, aryls and aralkyls of from about 6 to 12 carbon atoms, ethers of from about to 6 carbon atoms with 1 to 3 oxygen atoms, and alkyl amines of from about 3 to 8 carbon atoms and 1 amine nitrogen atom. An SG group can be attached to this $R_1$ group, if desired.

LG, the leaving group, is generally an aromatic moiety, in particular, often an aryloxy group of from about 6 to about 12 carbon atoms. Representative LG groups include structures (a) and (b):

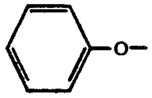

(a)

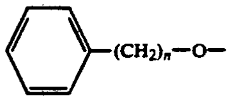

(b)

(wherein n equals from 1 to about 4) and the like. In such LG groups, the aromatic ring may be substituted with one or more SG groups and/or with one or more alkyl, halogen, acyl, aryl, or alkoxy groups, if desired.

The activators used in accord with this invention will always include at least one SG group. It is possible for them to contain more than one SG group, for example two, three or four such groups so long as the activators have the required solubility properties. If two or more SG groups are present, they can be the same or different and located in the same region of the activator or in different regions.

Typical activators which would be useful herein because of their insolubility in storage and solubility in use are as shown in structures (c), (d), (e), (f) and (g):

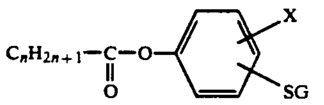

(c)

wherein X is hydrogen, $C_{1-4}$ alkyl, acyl or alkoxy, an aryl or about 6 carbon atoms, or a chloro, bromo or iodo; n is 1 to 20; and SG is as defined above;

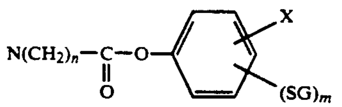

(d)

wherein n is 1 to 20, m is 1, 2 or 3, $R^1$ and $R^2$ each are H or $C_ZH_{2Z+1}$, and z is 1 to 20 and SG is as defined above;

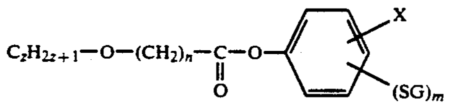

(e)

wherein n and z are each 1 to 20, m is 1, 2 or 3, and SG is as defined above;

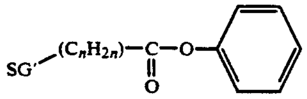

(f)

wherein n is 1 to 20, and SG' is a COOm or a COSH, m is 1, 2 or 3; and

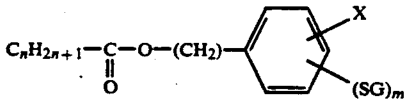

(g)

wherein n is 1 to 20, and m is 1, 2 or 3.

One preferred group of activators can be described structurally as having the formula:

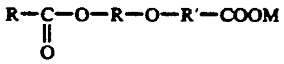

wherein R is an alkyl of 1 to 12 carbon atoms and R' is an arylene group of 6 carbon atoms, optionally with an "X" substituent as above described, which will exert an electron-withdrawing effect in the central

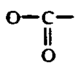

group to promote substitution by perhydroxyl ions (OOH−) M is hydrogen, an alkali metal ion, or an alkaline earth metal ion—usually either +or NA+. (If M is a metal ion, when the activator is placed in an acidic medium, the metal ion will immediately be substantially replaced by hydrogen.) Such an activator can undergo the following reactions in pH 7 or greater aqueous media:

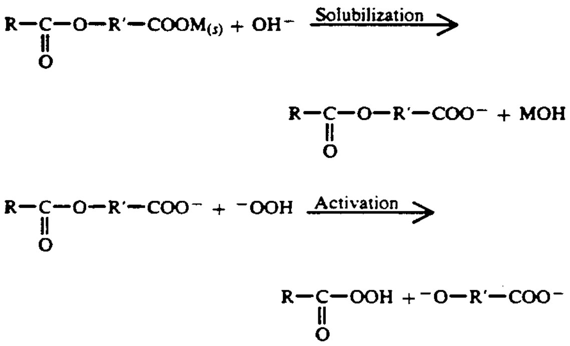

Preferred R groups have from 3 to 10 carbon atoms, more preferred is 5 to 9 carbon atoms, and normal $C_7$ alkyls being the most preferred. R′ can preferably be selected from 6 to 10 carbon atom arylenes which optimally contain up to two alkyl substituents totalling up to 8 carbon atoms. Phenylene is the most preferred R′ group in this class of activator.

Taking the above-defined preferences into account one can define a more preferred group of activators as having the following formula (h):

(h)

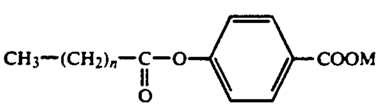

wherein n is an integer from 2 to 8, especially 4 to 8 and more preferably about 6, and M is hydrogen, NA+or K+. The COOM group can be at various positions on the aromatic ring, with the position para to the —O— link being preferred.

The above described activators can be produced by methods known in the art. One generally applicable process for forming the:

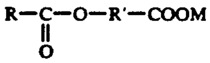

activators involves first forming an anhydride of the formula:

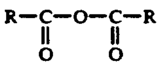

by condensing two molecules of:

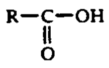

acid in the presence of excess acetic anhydride under dehydration conditions, and then, reacting the anhydride so formed with a hydroxy-substituted acid of the formula:

HO-R′-COOM generally in the presence of strong acid. An alternative process proceeds through acid chlorides. Other synthetic processes can be found in published European application 105,673, dated April 18, 1984 (Hardy et al.); *Kirk-Othmer Encyclopedia of Chemical Technology,* 3d. Ed., Vol. 22, p. 348; and Rabjohn, *Organic Synthesis,* Vol. 4, pp. 635-638 (1963). The activators can be recovered as solids and are used as particulate solids in the compositions of this invention. They are generally ground or otherwise divided to a size of about 140 mesh or smaller, preferably to a size of 500 microns or less to facilitate their dispersal and suspension in the bleach composition.

The solid activator is added in amounts of from about 0.1 to about 10.0 moles per mole of hydrogen peroxide. Since the activator is more expensive than hydrogen peroxide it is preferred for economic reasons not to use large excesses of activator so that amounts of from 0.2 to 2 moles of activator per mole of hydrogen peroxide, and especially 0.3 to 1 mole of activator per mole of hydrogen peroxide, are preferred.

A particularly preferred bleach activator for the thickened peroxygen bleaching compositions herein is a p-(n-octanoyloxy) benzoic acid (OBA) having the following structure (i):

(i)

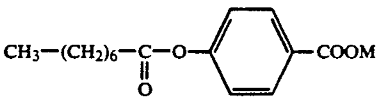

To ensure stable suspension of the precursor, it should have a particle size range on the order of about 0.01-100 microns, most preferably 0.01-10 microns. This can be accomplished by any means known in the art such as mechanical means including milling or grinding. When placed in an alkaline wash (or rinse) medium, the peracid precursor becomes soluble, and forms its corresponding peracid.

Stabilizing System

A useful stabilizing system for compositions of the invention comprises an antioxidant or a chelating agent. It is thought that the chelating agent acts to sequester heavy metal cations, especially polyvalent metals such as copper and iron, which are always present in small amounts among the mineral components in water. These heavy metal cations normally have the ability to catalyze peroxide homolysis and to mediate free-radical generation. These capabilities are inhibited by the chelating agent. The stabilizing system also may include an antioxidant which appears to work by tying up free-radicals initially formed in the solution, removing the ability of free-radicals to degrade organic components and also stopping the self-propagating free-radical cascade reaction. By such a mechanism, destruction of the surfactants, fluorescent whitener and optional oxidizable components (e.g., fragrance and dye) is arrested or reduced. Both the chelating agent and antioxidant are preferably present to attain the desired stability of the peroxide bleaching composition. However, less preferred embodiments of the invention can omit either the chelating agent or antioxidant.

The chelating agent may be selected from a number of known agents which are effective in chelating heavy metal cations. The chelating agent should be resistant to hydrolysis and oxidation by oxidants. Preferably it should have an acid dissociation constant (pKa) of about 1-9, indicating that it dissociates at low pHs to enhance bonding to metal cations. The most preferred chelating agent is an amino polyphosphonate which is commercially available under the trademark "Dequest" and sold by the Monsanto Company. Specific examples of effective Dequest products include Dequest 2000, Dequest 2010, Dequest 2041 and Dequest 2060.

Other related chelating agents such as pyrophosphates may also be utilized. EDTA-type chelating agents will also perform well. The chelating agent should be present in an amount sufficient to tie up any heavy metal cations present in the solution. The preferred range is 0.02 to 5% by weight, more preferred 0.04 to 3% by weight, and most preferred is 0.06 to 1.0% by weight.

The antioxidant functions as a free-radical scavenger. Preferred for this purpose are substituted phenols, or more broadly, hydroxy benzenes. Of this class of compounds, butylated hydroxy toluene (BHT) and mono-t-butyl hydroquinone (MTBHQ) have been found to be especially effective. The antioxidant must resist oxidation by $H_2O_2$ and therefore cannot be too strong a reducing agent. It is also desirable that the antioxidant hydroxy benzenes be partially hindered, i.e., having a substituent alkyl or similar group attached to some of the reactive sites on the ring structure. It is necessary to block some of the reactive sites so that reactions with multiple available free-radicals resulting in polymerization and possible phase separation do not occur. BHT and MTBHQ satisfy all the above criteria and are therefore preferred as antioxidants. BHT is commercially available from the Uniroyal Chemical Company, while MTBHQ is commercially available from the Eastman Chemical Company. Only very small amounts of antioxidant are necessary in the bleach composition. A preferred range is about 0.005–0.4% by weight, more preferred is 0.007–0.03% by weight, and most preferred is 0.01–0.02% by weight.

Other Optional Ingredients

The peroxide bleaching composition may include small amounts of components such a fragrances, commercially available from, for example, International Flavors and Fragrances, and dyes such as acid blue. It is also contemplated that fluorescent whitening agents or dyes which do not fall within the thickening-effective classification could be added to perform only their whitening or dying function. Thickening-effective fluorescent whitening agents would, of course, be present to both thicken and whiten, and the extra fluorescent whitening agents would serve to increase brightening without increasing thickening.

The balance of the formulation is, of course, water. It is preferred for stability purposes to use deionized or distilled water to reduce metal ion contaminates to as low a level possible. It may be noted, however, that even with metal ion contamination of 2–10 ppm or more, the stabilizing system of the present invention remains effective.

Although the present invention has been described with reference to specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

It is claimed:

1. A thickened acidic liquid composition useful as a laundering aid comprising:

an acidic aqueous solution having a liquid bleach source therein with from about 0.05 wt. % to about 50 wt. % active bleach species; and, a thickener for the aqueous solution dissolved therein and in an amount effective to thicken the aqueous solution and to maintain the aqueous solution as a stably thickened clear composition, the thickener consisting essentially of an amine containing fluorescent whitener normally insoluble at acidic pH that is solubilized in the aqueous solution with the whitener being present in an amount of between about 0.05 wt. % to about 1 wt. % of the total composition, an alkyl sulfate or alkyl aryl sulfonate surfactant with the alkyl sulfate surfactant or aryl alkyl sulfonate surfactant being present in an amount of between about 0.1 wt. % to about 10 wt. % of the total composition, and a polymeric amide, the polymeric amide being present in an amount of between about 0.01 wt. % to about 5 wt. % of the total composition, the polymeric amide being a polyvinyl pyrrolidone selected from the group consisting of polyvinylpyrrolidone homopolymer copolymers of vinylpyrrolidone with vinyl acetate, styrene, vinylchloride, vinyl ethers, acrylic acid, methacrylic acid, esters, maleates, fumarates, and alkylpyrrolidone surfactants.

2. The liquid composition as in claim 1 wherein the bleach source is a liquid peroxide with from about 0.05 wt. % to about 35 wt. % active bleach species.

3. The liquid composition as in claim 1 optionally including from about 0 wt. % to about 3 wt. % nonionic surfactant.

4. The liquid composition as in claim 1 wherein the polymeric amide has the structure

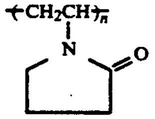

wherein n is between about 100 to about 10,000.

5. The liquid composition as in claim 1 wherein the amine containing fluorescent whitener has a stilbene or biphenyl structure.

6. The liquid composition as in claim 1 wherein the alkyl sulfate surfactant has a $C_{-18}$ alkyl group or an alkylaryl sulfonate surfactant containing a $C_{6-18}$ alkyl group.

* * * * *

UNITED STATES PATENT AND TRADEMARK OFFICE

CERTIFICATE OF CORRECTION

PATENT NO. : 5,106,523

DATED : April 21, 1992

INVENTOR(S) : David Peterson

It is certified that error appears in the above-identified patent and that said Letters Patent is hereby corrected as shown below:

Column 14, line 39, in Claim 1 — insert ---,--- after "homopolymer"

Column 14, line 65, in Claim 1 — insert ---6--- after "C"

Signed and Sealed this

Thirteenth Day of July, 1993

Attest:

MICHAEL K. KIRK

Attesting Officer

*Acting Commissioner of Patents and Trademarks*